United States Patent [19]

Orlandi

[11] Patent Number: 5,070,906

[45] Date of Patent: Dec. 10, 1991

[54] WATER MIXER VALVE WITH SEPARATE CONTROLS FOR THE DELIVERY OF TWO TYPES OF WATER

[75] Inventor: Alessio Orlandi, Castiglione d/Stiviere, Italy

[73] Assignee: Galatron S.r.l., Castiglione d/Stiviere, Italy

[21] Appl. No.: 689,969

[22] Filed: Apr. 23, 1991

[30] Foreign Application Priority Data

Apr. 24, 1990 [IT] Italy .................................. 5159 A/90

[51] Int. Cl.$^5$ .............................................. F16K 11/20
[52] U.S. Cl. .................................... 137/606; 251/250; 251/318
[58] Field of Search ................. 137/606, 454.6, 454.2, 137/594; 251/250, 318, 319, 325, 326

[56] References Cited

U.S. PATENT DOCUMENTS

| | | | |
|---|---|---|---|
| 3,736,959 | 6/1973 | Parkison | 137/454.6 X |
| 3,903,926 | 9/1975 | Constantinesco | 137/606 X |
| 4,150,684 | 4/1979 | Kervin | 137/606 X |
| 4,185,659 | 1/1980 | Bernat | 137/454.6 X |
| 4,275,866 | 6/1981 | Jamar | 251/250 |
| 4,325,403 | 4/1982 | Uhlmann | 137/454.6 X |

FOREIGN PATENT DOCUMENTS 2314657 10/1973 Fed. Rep. of Germany ...... 137/606

*Primary Examiner*—Stephen M. Hepperle
*Attorney, Agent, or Firm*—McGlew & Tuttle

[57] ABSTRACT

The present invention relates to hot and cold mixer valves which have cartridge type bodies and valvular means made up of overlapping ceramic disks in which flows of cold and hot water is controlled by the valvular means with independent controls, that is to say with two separate control levers, one for hot water and one for cold water.

3 Claims, 2 Drawing Sheets

WATER MIXER VALVE WITH SEPARATE CONTROLS FOR THE DELIVERY OF TWO TYPES OF WATER

The present invention relates to cold and hot water mixer valves which have cartridge type bodies and where inside said bodies there are valvular parts made up of overlapping disks, possibly ceramic, with inlet holes for cold and hot water.

The above mentioned mixer valves usually comprise two disks, a fixed one and a movable one. The fixed disk inside the cartridge type body has two openings respectively for cold and hot water coming from two separate conduits and has an outlet hole sending the water towards the tap. The movable disk is positionable on the fixed one through the use of a control lever and has a mixing chamber which is partially or totally positionable away from or in correspondence to the openings of the fixed disk so as to control the delivery of water.

So as to position the movable disk on the fixed one, the movable disk is subject to transversing and rotation, even together. Similarly, a control lever is uaually fitted in the cartridge type body with the possibility of oscillations on a transversal axis and rotates around a vertical axis. The opening and closing of the valvular parts for the delivery or prevention of delivery of water generally corresponding to the oscillations of the control lever; the angualar positionings of the movable disk on the fixed one for the choice of delivery of only cold water, only hot water or to change the proportions of the two types of water mixed correspond to the rotation of the control lever in one direction of the other.

Therefore, at this stage of technique, the opening, closing and regulation of the flow in said mixer valves are controlled by a single control lever. This though requires a particular and relatively complicated fitting of the control lever as well as two movements of the control lever by the user when regulating the water delivered.

Furthermore, the use of a single control lever does not allow the user to immediately and safely determine the real closing/opening condition of the valve in the way of being able to tell straight away at the opening of the valves what type of water to draw. The user therefore, often finds that he is receiving hot or mixed water instead of only cold water or vice versa and has to intervene and correct the situation. Apart from the necesssary extra movements, there is also a possible waste of water, especially hot water, with energy and econmic losses.

The object of the present invention is to solve the above mentioned problem in a new and effective way, reducing the inconveniences and disadvantages without altering the configuration and the general dimensions of the mixer valve.

This is carried out through a doubling of the valvular and control means in a single cartridge type body so that the flow of hot water on one side and the flow of cold water on the other can be regulated and intercepted separately with different means. The two types of water, when delivered simultaneously and possibly of different measures, are mixed downstream from the valve before coming out of the tap.

The mixer valve here proposed is substantially in accordance with claim 1 which will follow.

Said mixer valve therefore, has a valvular part for hot water regulated by a first control lever and a valvular part for cold water regulated by a second control lever. Said valvular parts can be placed side by side in the cartridge type body and the control levers can likewise by placed side by side, even on a single pin and can be moved separately.

The embodiment here proposed is particularly simple seeing that the valvular parts only need a single straight transverse movement between an open and closed position and vice versa. Similarly, it will suffice that each lever has a single oscillating movement in a single plane for the transmitting of such a movement to the valvular parts by way of straight movements.

It is also obvious why it becomes impossible to unintentionally draw hot or mixed water instead of cold water which would lead to a waste of energy.

The position of the levers infact unmistakably indicates the condition of the valve and only by intentionally adjusting one or both levers is it possible to change the condition, thus delivering hot, cold or mixed water as desired.

Further details of the invention will appear clearer following the description with references being made to the attached drawings in which.

Figure 1:
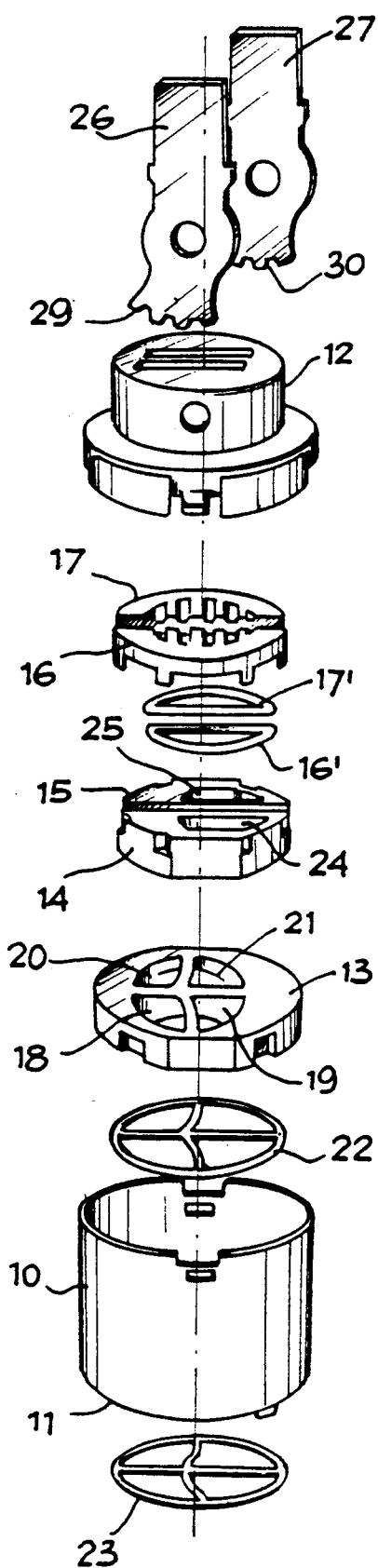
FIG. 1 is an exploded view of the elements of a mixer valve in accordance with the invention.
Figure 2:
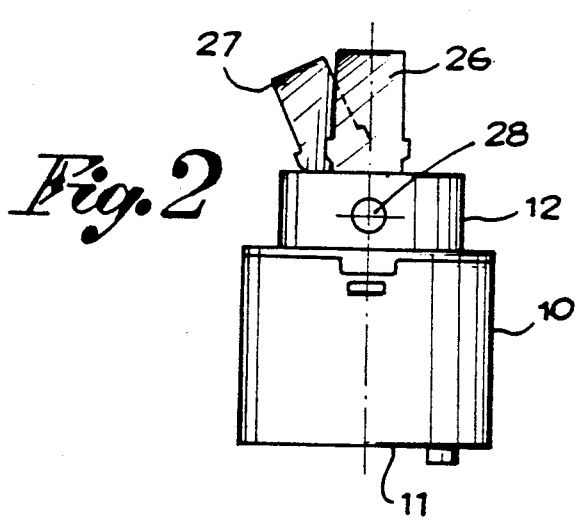
FIGS. 2 and 2a are side views of a valve which has been assmebled respectively without and with a distribution base.
Figure 3:
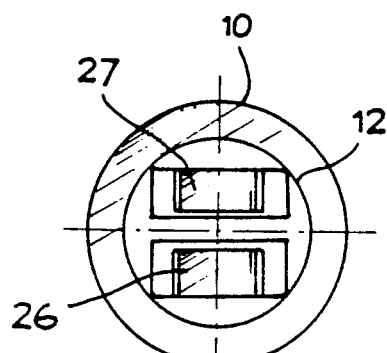
FIG. 3 is a plan view of the valve.
Figure 2A:
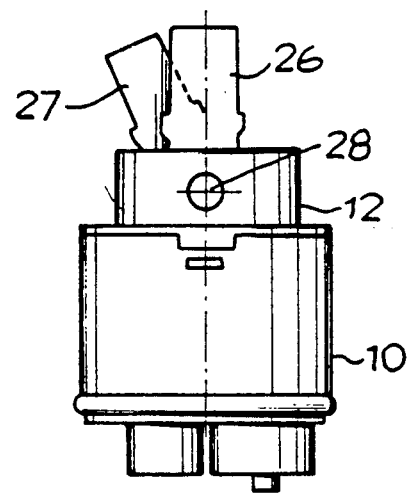

The mixer valve in question comprises a vartridge type body (10) with a bottom (11) and closed at the top by a lid (12) which is clipped into place.

In said body a fixed disk (13) is placed next to the bottom. Two movable disks (14, 15) rest and slide on the fixed disk (13) side by side and are both engaged to respective disk covers (16, 17). The fixed (13) and movable (14, 15) disks can be made in ceramic or other appropriate materials.

The fixed disk (13) is locked to the bottom (11) of the body (10) by appropriate means and has a first pair of holes or slots (18, 19) which coincide with two openings (not shown) cut into the bottom (11) and a second pair of holes or slots (20, 21) which in turn coincide with two other openings (not shown) cut into said bottom. A seal (22) is positioned between the fixed disk (13) and the bottom (11) of the body (10) so as to separate the holes (18-21) of the disk (13) from each other on one side and the openings on the bottom on the other side. Similar seal (23) is positioned on the external surface of the bottom of the body which encircles the openings on the bottom.

One movable disk (14) has a connection chamber (24) positionable in total or partial correspondence to the holes of the first pair (18, 19) of the fixed disk (13) so as to either join them or separate them following the change of position of the movable disk. Similarly the other movable disk (15) has a connnection chamber (25)

positionable in total or partial correspondence to the second pair or holes (20, 21) of the fixed disk.

Hot water coming from a water delivery conduit which is connected in a known way to coincide with the openings at the bottom of the body (11), enters from a hole (e.g. 18), of the first pair of holes (18, 19) of the fixed disk (13). Said water is delivered from the other hole (19) of said first pair when the chamber (24) of the movable disk (14) is at least partially in correspondence to said holes (18, 19). Similarly, cold water coming from a water delivery conduit which is connected in a known way to the coinciding openings at the bottom of the body (10), enters from a hole (e.g. 20) of the second pair of holes (20,, 21) of the fixed disk (13). Said water is delivered from the other hole (21) of said second pair when the chamber (25) of the other movable disk (15) is at least partially in correspondence to said holes (20, 21).

The hot water inlet/outlet holes (18, 19) are shown in FIGS. 4 to 8 with a crossed-line shading whereas the cold water inlet/outlet holes (20, 21) are shown with a straight-line shading. The delivery of water is opened, closed and regulated by the movable disks (14, 15) and the mixing of hot and cold water, when delivered together, comes out from the valve in the mouth or pipes connected to it.

The disk covers (16, 17) are engaged to the relative movable disks through the use of teeth (FIG. 1) and with the interpositioning of seals (16', 17') encircling the chambers (24, 25). The disk covers will have control part inside the cartridge type body so as to maintain the desired orientation, even during the changing of position of the movable disks.

The two movable disks (14, 15) are controlled independently and separately from each other by two control levers (26, 27) which are both pivoted with a transversal pin (28) on the lid (12) of the cartridge type body (10) and are subsceptible to oscillating that is controlled by a handle (not shown). Each lever (26, 27) engages the corresponding disk cover (16, 17) with a toothed coupling (29, 30) and in such a way that only a straight transverse of the relative movable disk on the fixed one corresponds to the oscillating of the controlled lever.

The delivery of hot, cold or mixed water is carried out by operating one, the other or both the independent levers (26, 27).

Figure 4:
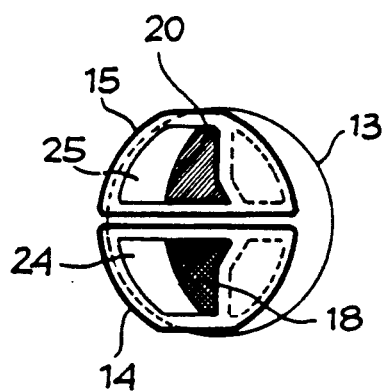
FIG. 4 is a transversal section view of the valve at the height of the valvular parts in a closed position.
Figure 5:
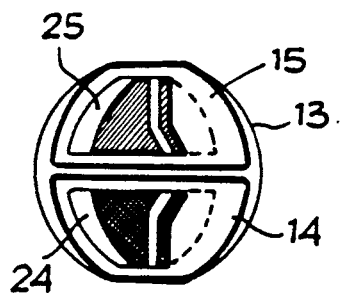
FIGS. 5 and 6 are similar section views as in FIG. 4, but with the valvular parts respectively in a semi-open and completely open position for the delivery of mixed water.
Figure 6:
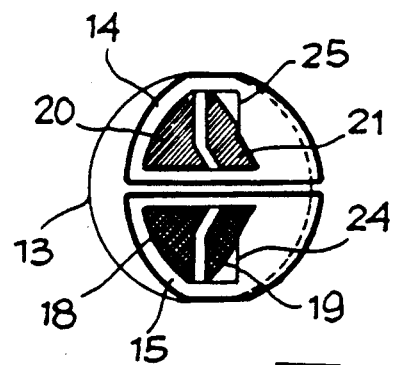

When both the movable disks (14, 15) are moved back, as in FIG. 4, so that they only overlap the relative hot (18) and cold water (20) inlet holes, the valve is closed. When the movable disks (14, 15) are moved towards the hot water (19) and cold water (21) outlet holes, the valve is partially or totally open so as to obtain delivery of mixed water with variable proportions as desired as shown in FIGS. 5 and 6.

Figure 7:
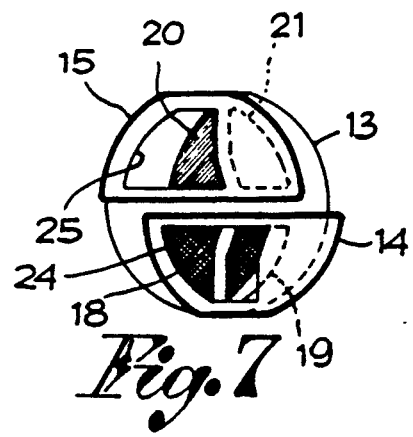
FIGS. 7 and 8 are again similar section views as in FIG. 4, but with valvular parts respectively in a position for the delivery of only hot water or only cold water.
Figure 8:
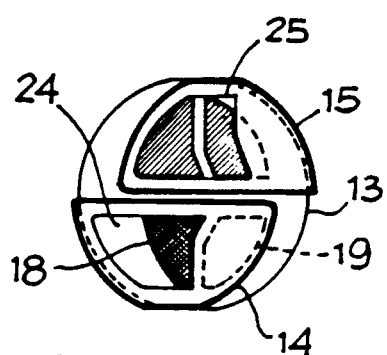

By leaving the second movable disk (15) in a completely backward position as in FIG. 7 and by moving the first movable disk (14), the delivery of only hot water with a variable flow is obtained. On the contrary, by leaving the first movable disk (14) backward and by moving the second movable disk (15), the delivery of only cold water with a variable flow is obtained, as in FIG. 8.

I claim:

1. A cartridge type body water mixer valve which has a bottom, is closed at the top by a lid and has valvular means made up of overlapping disks in ceramic or other material fitted inside said body and having water inlet and outlet holes, characterized in that it comprises a fixed disk (13) on the bottom of the cartridge type body which has two pairs of holes (18, 19; 20, 21), where a hole of a first pair is for the inlet of hot water coming from a connected water delivery conduit and the other hole (18, 19) is for the outlet of hot water towards a tap, and where a hole (20, 21) of a second pair is for the inlet of cold water coming from a connected delivery conduit and the other hole (20, 21) is for the outlet of cold water towards said tap, the hot and cold water when drawn together being mixed downstream from the valve in said tap; a first movable disk (14), resting on and movable on the fixed disk (13) having a connected chamber (24) positionable in partial or total correspondence to the first pair of holes (18, 19) so as to connect or prevent the connection of them to each other following the movements of said first disk; a second movable disk (15), resting and movable on the fixed disk (13) having a connecting chamber (25) positionable in partial or total correspondence to the second pair of holes (20, 21) so as to either connect or prevent the connection of them to each other following the movements of said second disk; and means to independently and separately actuate said movable disks (14, 15) on the fixed one.

2. A mixer valve as claimed in claim 1 characterized in that each movable disk (14, 15) is constrained to a relative disk cover (16, 17) which is controlled inside the cartridge type body (10) and in that an oscillating control lever (26, 27) is connected to each disk cover (16, 17), the two control levers being fitted on an oscillating axis (28) fixed to the lid (12) of the cartridge type body (10) and being independently and separately movable from each other for the movements of the corresponding movable disks (14, 15) where the levers are engaged with the disk covers (16, 17) through a toothed coupling (29, 30) for transforming the oscillating movement of the levers into a straight transversal movement of the movable disks.

3. A mixer valve as claimed in claims 1 and 2, characterized in that the first and second pair of holes (18, 19; 20, 21) of the fixed disk (13) coincide with the same number of openings cut in the bottom of the cartridge type body, where separate hot and cold water deliver conduits are connected to two of said openings and said openings and holes of said pair of holes are hydraulically separated with seals (22, 23) on both the inside and outside surface of the bottom of said body.

* * * * *